United States Patent [19]
Hardy

[11] 3,856,319
[45] Dec. 24, 1974

[54] LIFTING AND LOWERING DEVICE FOR TRAILERS

[76] Inventor: Clyde Hardy, 119 W. 1st St., Cordell, Okla. 73632

[22] Filed: Sept. 26, 1973

[21] Appl. No.: 401,022

[52] U.S. Cl............. 280/43.18, 280/43.23, 280/63, 280/106 T
[51] Int. Cl............................................. B62d 33/08
[58] Field of Search........... 280/43.23, 43.18, 43.17, 280/43.19, 414 R, 63; 180/22 D, 22 E, 24.02

[56] References Cited
UNITED STATES PATENTS

| | | | |
|---|---|---|---|
| 2,453,388 | 11/1948 | Schramm | 280/43.18 X |
| 2,835,400 | 5/1958 | Latzke | 280/43.18 X |
| 2,918,298 | 12/1959 | Starr | 280/43.23 |
| 3,315,978 | 4/1967 | Chieger et al. | 180/24.02 X |
| 3,494,630 | 2/1970 | Smith | 280/43.19 |

Primary Examiner—David Schonberg
Assistant Examiner—Michael J. Forman
Attorney, Agent, or Firm—Krafft & Wells

[57] ABSTRACT

A power actuated bell crank construction built into a spring means and supporting axle for a trailer, making it possible to lower the trailer bed for ease of loading and unloading and then raise it to the transporting position.

3 Claims, 3 Drawing Figures

PATENTED DEC 24 1974

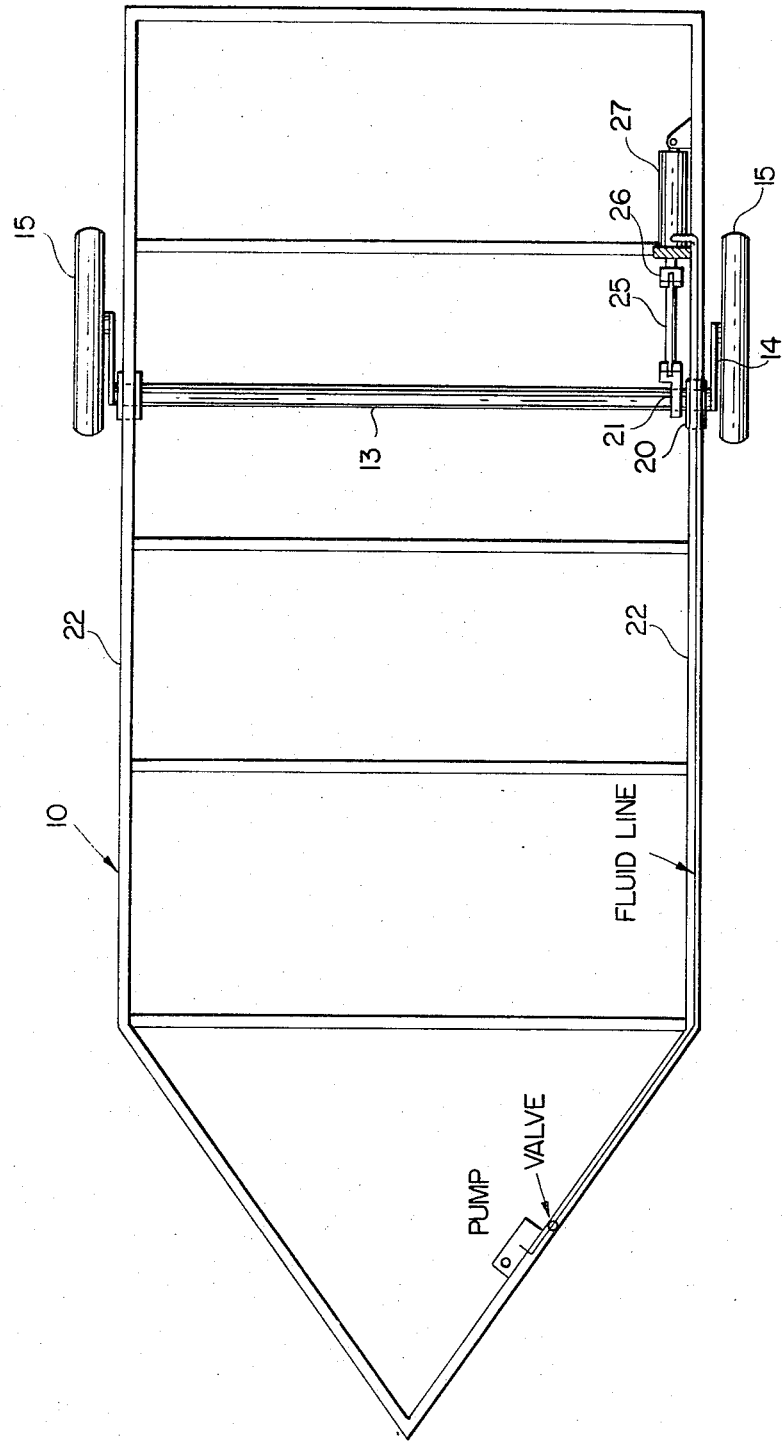

– 3,856,319 –

LIFTING AND LOWERING DEVICE FOR TRAILERS

BACKGROUND OF THE INVENTION

Various prior art teachings are available showing constructions for raising and lowering a trailer bed relative to the road, while the bed is supported on its wheels. Typical examples are the mechanisms shown in the U.S. Pat. Nos. to Schramm, Nov. 9, 1948 No. 2,453,388, Warner, Mar. 28, 1950 No. 2,501,750, and Byrd, Mar. 28, 1950 No. 2,502,309. The U.S. Pat. to Getz, Dec. 16, 1952 No. 2,621,942 shows such a general arrangement on a boat trailer as does Latzke, May 20, 1958 U.S. Pat No. 2,835,400 and Franklin, Jan. 30, 1962 U.S. Pat. No. 3,018,906.

SUMMARY OF THIS INVENTION

This invention provides a simplified structure that is adapted to be built into a conventional trailer or may be sold in a kit form for attachment to many existing trailers. It makes use of a simple bell crank means integral with the main axle having crank arms at each end of the support axle, the wheels being carried on stub axles at the ends of the bell crank arms. The bell crank means includes an operating lever integral with the main axle that may be actuated by manually operated means such as the cylinder and piston of a hydraulic jack or other extensible jacking means, or a power source may be used to drive a motor driven extensible means. The main axle is preferably carried on the spring means of the trailer so that by simply operating the bell crank means the bed of the trailer is raised and lowered relative to the ground.

IN THE DRAWINGS

FIG. 3 is a top plan view of the trailer as shown in FIG. 1.

DETAILED DESCRIPTION

Figure 1:
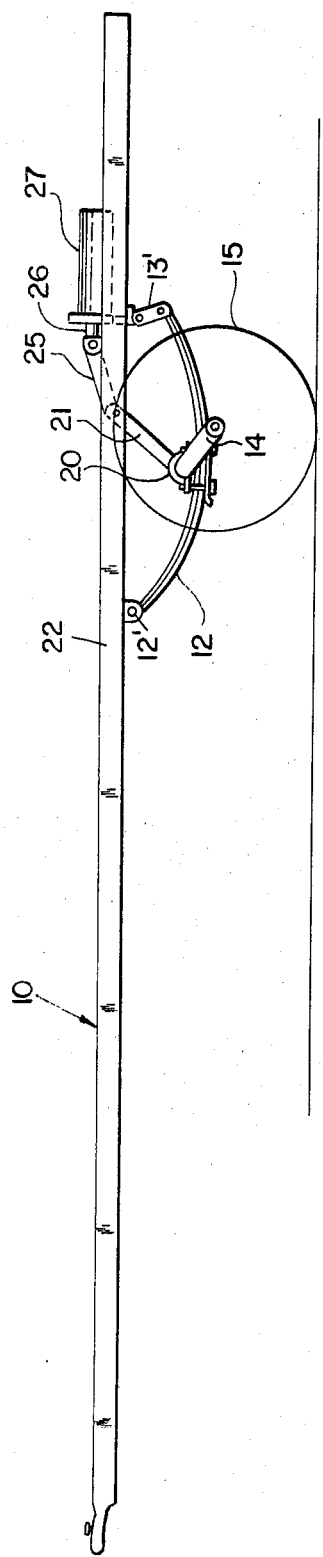
FIG. 1 is a side elevation of a trailer with my invention on it, raised to position for travel on the road.

In the structure shown in the drawings the trailer bed 10 is adapted to be supported at its front end on a suitable trailer hitch (not shown). The load carried on bed 10 is transmitted through enlongated leaf springs 12, one on each side of the trailer, to a main axle element 13 and integral crank arms 14 that support wheels 15 on stub axles integral with these arms at their outer ends. The leaf springs are each pivotally connected to the frame 10 at their front ends as indicated at 12' and are each connected at their other ends to frame 10 by means of the articulating links 13'. The axle 13 is carried to oscillate in bearing means 20 fixed to the top side of springs 12 by suitable U bolt means and an operating lever 21 is fixed integral with axle 13. The lever 21 is keyed or otherwise fixed to the axle 13 adjacent one of its ends and is of such a length that as the axle rotates the upper end of the lever is about even with or just below the upper surface of a side rail 22 forming a part of the bed 10 of the trailer. The lever 21, axle 13 and crank arms 14 together form a bell crank means.

The wheels 15 as above stated are rotatably mounted on stub axles carried at the ends of crank arms 14. The upper end of lever 21 is pivotally connected to a link 25 that in turn is pivotally connected to the end of a piston rod 26 driven by a suitable piston in the hydraulic cylinder 27. The elongated cylinder 27 is fixedly carried on side rail 22 of the trailer so that the pivot end of the piston rod is located approximately over the articulating link 13' when the piston is fully retracted and locked in that position when the trailer bed is raised for travel along the highway as shown in FIG. 1. The hydraulic motor including cylinder 27 and its piston, may be selected to have a sufficient mechanical advantage to be manually driven or if the trailer is to carry a very heavy load, the motor may be power driven from any suitable source.

Figure 2:
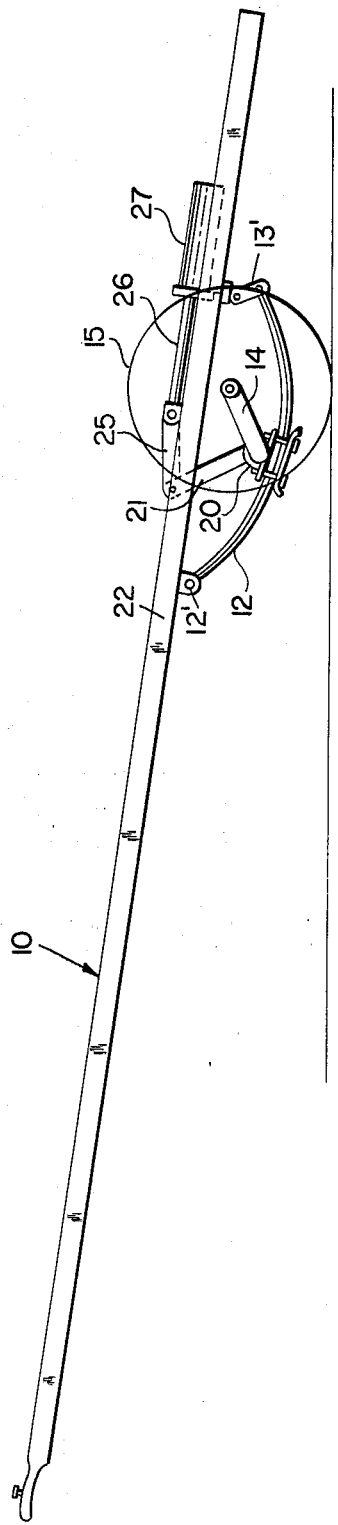
FIG. 2 is a side elevation of the trailer in FIG. 1 showing the trailer bed lowered for unloading.

When making use of this invention, the trailer may be loaded and with the bed in the position shown in FIGS. 1 and 3 the vehicle may be pulled over the road. The hydraulic motor may be locked with the piston in the fully retracted position within cylinder 27 as seen in FIG. 3 whereby the wheels 15 are held in proper position by the bell crank means formed of lever 21, axle 13 and crank arms 14, to support the bed 10 elevated above the road. The articulated link connection 25 between the piston rod 26 and lever 21 permits the axle to move freely up and down with the spring relative to the motor fixed to the side rail 22 of the bed of the trailer. When it is desired to unload the trailer, the hydraulic fluid under pressure for powering the cylinder 27 is delivered to the other end of this hydraulic motor to move the piston to extend the piston rod fully to the position shown in FIG. 2 in order to drive link 25 and lever 21 to oscillate axle 13 in the bearings 20. When the axle is rotated in a counter clockwise direction referring to FIG. 2, the crank arms 14 rotate about their stub shafts on which the wheels are mounted, whereby the bed 10 that is carried on springs 12 supported on the main axle 13, is lowered toward the ground. The front end of the trailer is supported on the hitch which is normally carried at a constant level so the bed assumes the inclined position shown in FIG. 2 for easy unloading and loading.

In the loading and unloading of boats to and from trailers having a typical frame structure for a bed, it has been found that a simplified raising and lowering means such as I have described, has particular utility. By lowering the the generally horizontal bed 10 from the position of FIG. 1 to the inclined position of FIG. 2, the boat may be smoothly delivered into the water by sliding the boat down a relatively gentle incline. With this structure, the wheels and axle mounting need not be backed into the water and yet the boat may be easily projected from the inclined bed to be floated on the water. Similarly when loading the boat back onto the trailer, because of the gentle slope of the bed, it is a much easier job to winch the boat up the incline onto the trailer bed. After the boat has been pulled home on the bed, it is a simple matter to operate the hydraulic pump to oscillate the main axle and rotate the bell crank arms clockwise as seen in FIG. 1, to raise the bed back to its parallel position relative to the road surface.

This construction provides a very simple means that may be built into new trailers or it may be sold separately as a simple kit adapted for installation on existing trailer constructions. The essential elements comprising the main axle 13, lever 21 and bell crank arms 14 can be easily mounted in bearings 20 having adaptors that may be bolted onto the spring structure of an existing trailer. When these elements have been assembled on the spring means at the wheel support station of a trailer, the wheels may be mounted on the stub axles carried by the crank arms and any suitable drive means having the necessary piston rod or other extensible power means may be used to operate lever 21.

Preferably lever 21 and its operating means are built into the trailer bed to lie below the load carrying area. The somewhat elongated hydraulic motor 27 either manually or power driven, and its reciprocating piston are well suited for this design but other means such as an electrically powered motor or other known devices may be adapted to operate lever 21. Locking means should be provided to hold the bed elevated from the road. When a hydraulic system is used the valves for controlling the fluid flow to and from cylinder 27 may be used to serve this purpose. If other drive means are provided to operate link 21, a suitable mechanical latching means may be used to prevent the rotation of axle 13 after the bed is raised.

While the above description makes mention of the loading and unloading of boats on and off of a trailer, the construction may be used on trailers adapted for other uses. The mounting of the rotating axle 13 with its bell crank means for carrying wheels 15 on springs 12 provides a simple and efficient structure for trailers, the beds of which may be tilted for easy loading and unloading.

While the above covers the preferred form of my invention showing it built into a two wheeled trailer, it may find a use in four wheeled trailer vehicles and other modifications thereof may occur to those skilled in the art that will fall within the scope of the following claims.

What is claimed is:

1. A trailer having a front and rear end with side rails forming a bed adapted for travel over the road and having a front hitch and at least two wheels disposed toward the rear of the bed to support the load carrying bed comprising a pair of elongated leaf spring means connected between the wheels and bed, one each of said spring means being disposed to extend longitudinally along each of the opposite sides of the trailer respectively and being pivotally connected to the trailer at the front end and connected to the trailer by means of an articulating link at its rear end, a main axle rotatably carried in bearings fixed to said spring means, crank arms at the ends of the main axle, stub shafts at the ends of said crank arms upon which said wheels are mounted, a lever fixed to one end of said axle to rotate the axle in said bearings, said lever being of a length to extend from said axle to the underside of one of said side rails whereby said crank arms are rotated with the axle supported on the bearings on said springs to turn on the stub shafts in the wheels to raise and lower the axle and the associated spring means and bed relative to the road, reciprocably driven power means connected to said lever with a link pivotally connected thereto, and power drive means mounted on the bed over the articulating link that connects the spring to the bed and said construction being operative to lower the bed relative to the ground when said driven power means is extended and to lift said bed for travel when said power means is retracted, to relieve the power means of undue load stresses when the trailer travels over the road.

2. A structure as in claim 1, wherein said power drive means constitutes an elongated hydraulic motor and the reciprocably driven power means is a reciprocating piston, said motor being carried on the bed of the trailer, said spring means being positioned on the under side of said bed, and said link pivotally connected to the driven power means is a pivotally connected link mounted between said piston and said lever whereby said axle may be actuated by said motor to drive the crank arms by moving the lever under the bed of the trailer.

3. A trailer adapted to be connected at its front end to a hitch on a towing vehicle, the trailer having a load carrying frame supported on two wheels located toward the back end of the underside of the frame comprising leaf spring means extending longitudinally in a front to back direction on each side of the frame at the wheel support station, each spring being pivoted to the frame at its front end and connected to the frame with an articulating link at its back end, an oscillating main axle for said wheels, bearing means for rotatably supporting the main axle on said leaf spring means, generally horizontally extending bell crank arms fixed to each end of the main axle, said bell crank arms having stub shaft means at their respective free ends for engaging said wheels to support the trailer, a lever integral with said main axle extending upwardly to the underside of the frame to complete said bell crank means, and a hydraulic motor having a reciprocating piston and rod means to control the movement of said lever to oscillate the main axle in its bearings on the springs, said motor being fixed to said frame over the back end of one of the articulating link connections of a spring to the frame, a link having a pivoted connection between the end of the piston rod and the upper end of said upwardly extending bell crank lever, said piston being reciprocable whereby to rotate said crank arms relative to the wheels to raise and lower said frame when desired with respect to the road, and said piston being retracted fully to raise the frame for road travel to free the piston rod of any travel load.

* * * * *